United States Patent Office 3,585,034

Patented June 15, 1971

3,585,034
MANUFACTURE OF PHOSPHOR SCREENS

Steven Levinos, Vestal, N.Y., assignor to GAF Corporation, New York, N.Y.

No Drawing. Filed Apr. 3, 1967, Ser. No. 627,644
Int. Cl. G03c *1/68, 5/00*
U.S. Cl. 96—35.1 13 Claims

ABSTRACT OF THE DISCLOSURE

Photosensitive compositions for color television picture tube manufacture comprising an ethylenically unsaturated monomer material and a catalyst system comprising (a) a stabilized diazonium salt which functions as an electron-acceptor and (b) a photosensitive co-catalyst selected from the group consisting of (1) a complex ferric salt containing an electron-donating group and (2) a mixture comprising a simple ferric salt and an organic polycarboxylic acid capable of reducing said simple ferric salt to ferrous when subjected to actinic radiation.

The present invention relates in general to the manufacture of color television picture tubes and in particular to the provision of improved photosensitive compositions for such purposes.

As is well known, phosphor glass screens of the type commonly employed in the fabrication of color television picture tubes comprise a plate provided with finely discrete patterns of three different phosphors each of which is capable of emitting radiation of a different primary color, i.e., red, green and blue. In general, such tubes are constructed in such fashion that a thin perforated metal mask is mounted parallel to the screen and a short distance away from the screen toward the gun end of the tube, such metal mask being provided with a concatenation of holes. Each of the holes provided in the metal mask corresponds to each of the primary colors, i.e., is positioned to illuminate a trio of red, green and blue emitting phosphor dots comprising a single unit of the aggregate phosphor dot pattern carried by the luminescent screen. In addition, three electron guns are mounted symmetrically about the axis of the tube. Each of the gun, mask and dotted screen elements are positioned in such manner that the electron beam from each gun is directed through the holes in the mask so as to strike phosphor dots of one primary color only.

Methods for the production of color television picture tubes of the aperture mask type are legion being extensively described in the prior art both patent and otherwise. For purposes of general classification, such methods are acknowledged to fall within one of three categories, namely, those based upon photographic reproduction techniques and silk screen printing respectively as well as numerous other processes currently considered to be of lesser commercial importance, e.g., letterpress printing, electrostatic printing, methods involving the settling of phosphors through masks, etc.

Although the methodology thus far promulgated in this connection is found in the vast majority of instances to provide satisfactory results, certain limitations which inhere in the very nature of such processing have nevertheless been confronted which tend to circumscribe severely the tube manufacturer's scope of operation with respect to for example, selection of the materials essential to the implementation of such methods, the processing conditions necessary for optimum performance, etc. For example, it has been ascertained that the silk-screen process is limited, for efficacious practice, to those applications wherein the plate employed as the support for the phosphor screen pattern is absolutely flat or planar. Consequently, processes of this type are substantially inapplicable as such in those instances involving the use of a plate element of arcuate or otherwise irregular configuration. The gravity of this particular limitation becomes acutely evident when it is realized that much of the industrial endeavor relating to the manufacture of color television tubes is specifically concerned with the fabrication of non-planar picture tube surfaces and particularly when the latter is of relatively large size. Color television picture tube technology has established to a reasonable certainty that picture tubes of arcuate as distinguished from planar configuration provides a much more highly efficient and practical tube structure. However, prior industrial efforts to extend the applicability of the silk-screen picture tube manufacturing process to the production of curved television tube surfaces have for the most part met with but marginal success. Invariably, resort to complex if not highly expensive ramifications, modification, etc. of the basic technique are made necessary in order to implement such processing with any degree of efficacy.

In contradistinction, color television picture tube manufacturing based upon photographic reproduction methods has met with a fairly impressive measure of commercial success. In general, such methods are implemented by the utilization of a photosensitive organic carrier or binder which, in the presence of a suitable catalyst material, undergoes a change in solubility characteristics as a direct result of actinic exposure. Such carriers or binders are often referred to in the art as "colloid" carriers, the quoted term connoting resinous materials of synthetic derivation or natural origin, typical representatives including polyvinyl alcohol and gelatin respectively. Light-sensitivity is imparted to the binder component by the incorporation of a suitable sensitizing agent such as potassium or ammonium dichromate. The binder material thus sensitized is thereafter applied to the inside surface of the television picture tube viewing panel by any one of several conventional coating techniques, e.g., flowing, spraying, whirling, etc. Any excess coating material can thereafter be readily removed by draining or spinning in a whirl coater until a uniform and even surface is obtained. It will be understood that the selection of a particular coating technique may well obviate any necessity for the use of auxiliary expedients whereby to obtain an even coating; thus, in the case of spray coating, the removal of excess light-sensitive binder may be easily accomplished by merely controlling the quantity of coating deposited by the spray applicator whereas uniformity of coating application may be controlled by judicious selection of the spray pattern. Upon completion of the coating operation and prior to drying of the coating thus deposited, i.e., while such coating remains in a moist or tacky state, a uniform screen of dry powdered luminescent phosphor, e.g., green phosphor of the type commonly used, is sprayed or otherwise deposited upon the tacky, radiation energy-sensitive layer. The phosphor-containing coating is then dried by conventional means and thereupon exposed to a radiant energy source through a conventional shadow mask. The latent-image dot pattern thus laid down represents the illumination locus or excitation area for one of the three primary colors, i.e., red, green or blue corresponding to one of the three cathode emitters of the tricolor tube. The final step involved in the formation of the phosphor pattern comprises the development operation wherein the entire surface of the panel is subjected to a wash-out operation, i.e., washed with a developing fluid such as deionized water, this treatment serving to remove the unhardened or nonexposed areas of the coating while permitting the exposed or hardened areas to remain intact. The aforedescribed chronology of operations is then repeated in its entirety for each of the remaining primary color aspects. In this manner there is obtained a complete tricolor pattern. As will be recognized, the dot patterns corresponding to the remaining color primary aspects in this case, the blue and red additive color primary aspects, conform in arrangement, i.e., distribution, pattern, etc. to the blue and red cathode emitters respectively of the tricolor tube.

It will be appreciated of course that a number of ramifications to the aforedescribed basic procedure are exploited on a commercial scale. For example, one such ramification involves as an essential expedient, the actinic exposure of the radiation-sensitive coating prior to drying, i.e., while such coating remains in a tacky condition. Upon completion of the exposure, a uniform screen of dry powdered phosphor is sprayed or otherwise deposited upon the coating surface. Again, the terminal point in the processing would comprise the development operation wherein the exposed and sprayed surface is treated with deionized water or other suitable solution whereby to effect physical removal of the unexposed, unhardened coating areas. The entire sequence of operations would then be repeated for each of the remaining primary color aspects in the manner hereinbefore described.

A still further ramification to the aforedescribed basic procedure and one currently enjoying relatively widespread commercial exploitation, involves as a signal feature, the utilization of the phosphor material in the form of a mixture, e.g., slurry or dispersion in the binder material. According to such method, the phosphor is provided in the form of a preliminary slurry or dispersion with the binder material, admixing being effected according to conventional techniques, the film-forming composition being thereafter applied to the inside surface of the picture tube panel by flowing or whirling. Following removal of excess coating by draining or spinning the coated layer thus obtained is exposed and developed in the manner previously delineated, the involved sequence of operation being repeated for each of the primary color aspects.

The processing subsequent to the laying down of the tricolor phosphor pattern and incidental to the obtention of a final color television picture tube unit is for the most part conventional in the art involving, for example, the usual steps of lacquering, aluminizing, inserting the shadow mask, sealing both sections of the tube to form an integral unit and finally, evacuating and baking at a temperature sufficient to burn away the binder.

Despite the fact that color television picture tube manufacturing operations of the aforedescribed type have met with a significant measure of commercial success, certain disadvantages and shortcomings have nevertheless been encountered in practice which tend to detract significantly from their commercial feasibility and desirability. Perhaps the most serious objection relates to the nature of the sensitizer material employed for purposes of imparting the requisite spectral response to the composition. To a great extent, commercial operations, as presently embodied, rely almost invariably upon the use of alkali metal dichromate sensitizing agents in combination with polyvinyl alcohol resin binders for use in the manufacture of luminescent screens for color television tubes. However, prior attempts to produce luminescent screens possessed of optimum luminosity, brilliance, etc. have, practically without exception, been vitiated due to the fact that residual chromium, in significant quantities, remains in the light-hardened areas of the coating. Unless removed at some phase of screen manufacture, e.g., development, wash-out, etc. such fugitive chromium remains present in the form of an oxide the latter resulting in a serious loss of brilliance of the phosphor material on electronic excitation. Such a situation is of course of critical import since it directly affects the viewing quality of the picture tube. The deleterious effects thus resulting are further aggravated by the fact that the point-to-point density distribution of the fugitive chromium may vary significantly with the concomitant result that not only is picture contrast seriously impaired, but more importantly, the capacity of the luminescent screen to accurately reflect the color component values directly attributable to electronic excitation is seriously reduced. Without intending to be bound by any theory, the following hypotheses have nevertheless been postulated in explanation of the foregoing situation. Eder, in an article published many years ago relating to quantitative studies of bichromated gelatin, concluded that bichromates in the presence of oxidizable organic matter tend to undergo decomposition according to a series of relatively complicated reactions resulting in the formation of neutral chromates as well as a chromic chromate, $m\mathrm{CrO_3}\cdot n\mathrm{Cr_2O_3}$ wherein $m$ and $n$ represent numerical coefficients, the latter compound further decomposing into chromic acid and green chromium oxide as a result of subsequent washing. The neutral chromate and chromic acid are, according to theoretical exposition, carried away by the water employed during the wash-out step. The chromium oxide, however, combines with the carrier or binder resulting in the formation of an insoluble complex, the reactions hypothesized therefor being the following:

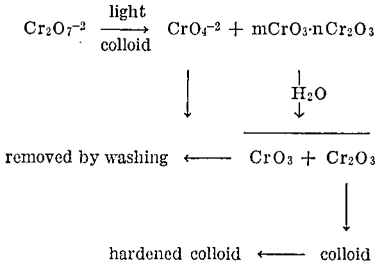

According to further evidence gathered by Popovitski, the product was identified as $4\mathrm{Cr_2O_3}\cdot 3\mathrm{Cro_3}$ which was presumed to result according to the following reactions:

$$16\mathrm{K_2Cr_2O_7} \rightarrow 16\mathrm{K_2CrO_4} + 8\mathrm{Cr_2O_3} + 12\mathrm{O_2}$$

$$6\mathrm{K_2Cr_2O_7} \rightarrow 6\mathrm{K_2CrO_4} + 6\mathrm{CrO_3}$$

Regardless of the reaction mechanism actually responsible for the presence of fugitive chromium, there is ample evidence to indicate that approximately 19% of the total dichromate salt sensitizer employed in the initial charge remains in the cross-linked polyvinyl alcohol in the form of the insoluble chromic oxide. In addition, it has been estimated that almost 22% of the dichromate salt sensitizer remains behind as the insoluble chromic oxide in those instances wherein ammonium dichromate is employed as the photosensitizer.

The use of dichromate-sensitized polyvinyl alcohol compositions of the type described in the manufacture of color television picture tubes presents the further disadvantage that the viscosity of the coating composition is subject to wide and continuous variation, i.e., is extremely unstable thereby necessitating frequent and appropriate viscosity adjustments in order to assure optimum performance readily reproducible in practice.

In an effort to overcome or otherwise alleviate the foregoing and related disadvantages, considerable industrial activity has centered around the research and development of more effective methods, materials, etc. for the production of luminescent screens for color television picture tubes. Although much in the way of meritorius achievement has characterized the efforts thus far expended in this regard, the problems surrounding the obtention of luminescent screens having the desired degree of brilliance, luminosity, etc. continue to challenge tube-manufacturing technology.

Thus, a primary object of the present invention resides in the provision of photosensitive compositions uniquely and beneficially adapted for use in connection with the manufacture of luminescent tricolor screens for color television picture tubes wherein the foregoing and related disadvantages are eliminated or at least mitigated to a substantial extent.

Another object of the present invention resides in the provision of photosensitive compositions and process for using same wherein problems associated with residual metal contamination are virtually eliminated.

A further object of the present invention resides in the provision of radiant energy-sensitive photopolymerizable compositions having excellent viscosity stability.

A still further object of the present invention resides in the provision of radiant energy-sensitive, photopolymerizable compositions having a high order of spectral response despite the use of reduced concentrations of photosensitizer.

Further objects and advantages of the present invention will become apparent hereinafter as the description proceeds.

The attainment of the foregoing and related objects is made possible in accordance with the present invention which in its broader aspects include the provision of radiant energy-sensitive photopolymerizable compositions comprising a normally liquid to normally solid vinyl monomer containing the grouping $CH_2=C<$ attached directly to an electronegative group and a radiation sensitive catalyst system which when subjected to radiant energy forms species capable of initiating the polymerization of said vinyl monomer, said catalyst system comprising (a) a stabilized diazonium salt which functions as an electron-acceptor and (b) a photosensitive co-catalyst selected from the group consisting of (1) a complex ferric salt containing an electron-donating group and (2) a mixture comprising a simple ferric salt and an organic polycarboxylic acid capable of reducing said simple ferric salt to ferrous when subjected to actinic radiation.

The photosensitive compositions of the present invention are beneficially adapted for use in the preparation of color television tube screens according to any of the aforedescribed procedures since the unique advantage is presented that only minimal concentrations of the ferric salt catalyst component are necessary in order to impart a high order of photosensitivity to the system when compared to the catalyst concentrations necessarily required with the radiation-sensitive systems heretofore promulgated in order to achieve an equivalent level of actinic response. Thus, one of the truly valuable aspects of the present invention is at once apparent, namely, the reduced quantities of metal salt material present in the photosensitive composition correspondingly ameliorates if not eliminates the complexity of problems which inevitably arise with the use of higher catalyst concentrations and in particular, problems associated with metal contamination.

It is envisaged of course that in a particular instance the speed requirements of the processor may well dictate the use of inordinately large catalyst concentrations, i.e., concentrations which would otherwise, i.e., ordinarily, fall within the proscribed range due to the increased possibility of severe metal contamination. However, the catalyst systems of the present invention are uniquely characterized in that any such concentration limitations are virtually non-existent. This of course results from the fact that the ferric salt material being water-soluble, such solubility remaining unaffected by the actinic exposure, is readily and easily removed as an incident to the solution treatments employed in post-exposure processing. Even in those instances involving the use of higher concentrations of catalyst, only negligible quantities—if any—of the ferric salts remain in the composition subsequent to processing the television tube panel in the manner previously described. In contradistinction, it is found with the conventional polyvinyl alcohol-bichromate systems that intolerable quantities of chromic oxide are retained despite subjection to vigorous post-exposure processing, said chromic oxide apparently being bound to the cross-linked polymer. The deleterious effects stemming from such metal contamination are manifested primarily in the form of reduced phosphor luminosity brilliance, etc. Moreover, the contamination problem persists despite resort to additional auxiliary treatments devised specifically to free the vinyl polymer material of the metal contaminant. By way of comparison, the polymerized areas obtained in accordance with the present invention are virtually devoid of any metal contamination.

The particular mechanism by which the generation of polymerization-initiating species occurs in accordance with the present invention has not been definitely ascertained and is not self evident. In any event, it has been hypothesized that the diazonium compound, i.e., the stabilized diazonium salt, functions as an electron-accepting compound this particular behavior being responsible for the generation of polymerization-initiating free radicals. Thus, the photo-induced reduction of ferric to ferrous provides $Fe^{++}$ species which functions as an electron-donator; polymerization-initiating species form as a result of the diazonium compound accepting an electron from the photoreduced $Fe^{++}$.

As described previously, the photo-induced reduction of the ferric compound proceeds only in the presence of an electron-donating group. The latter group may be present as part of the ferric compound per se as would be the case with the complex ferric salts as typified by such representatives as ferric ammonium oxalate, ferric ammonium sulfate, and the like. In such instances, the catalyst-generating system may comprise simply the complex ferric salt and the electron-accepting diazonium compound. The complex ferric salts undergo a photoreduction reaction involving the internal transfer of an electron from the anion to the ferric cation, thereby providing the necessary electron-donating species, i.e., ferrous. In contradistinction, the simple ferric salts, being devoid of an electron-donating group, may only be used in the presence of a further material containing an electron donating group, said material being capable of reducing the simple ferric salts upon exposure to actinic radiation. Particularly preferred for use in accordance with the present invention in those instances involving the use of the simple ferric salts is the use of electron-donating compound comprising organic, dicarboxylic acids, such as oxalic acid, tartaric acid, and the like. Such compounds may also be effectively employed in the form of their salts with water-solubilizing cations, e.g., with sodium, potassium, ammonium, and the like. Accordingly, the term acid as used herein is to be interpreted as including such salt derivatives.

The ferric salts found to be suitable for use in accordance with the present invention encompass a relatively wide range of materials with specific representatives including for example, ferric ammonium oxalate, ferric ammonium citrate, ferric ammonium sulfate, ferric oxalate, ferric acetate, ferric ammonium tartrate, ferric bromide, ferric chloride, ferric citrate, ferric formate, ferric potassium citrate, ferric potassium oxalate, ferric potassium tartrate, ferric quinine citrate, ferric sodium oxalate, ferric salicylate, sodium ferricitropyrophosphate, ferric sulfate, etc.

The quantity of ferric salt employed may, within certain limitations, vary depending again upon the speed requirements imposed upon the processor. In any event, for the vast majority of commercial application it has been determined that ferric salt concentrations ranging from about 0.1% to about 0.6% by weight of the total weight of coating composition with a range of from about 0.2% to about 0.3% being particularly preferred are eminently suitable.

As previously mentioned, within the class of materials encompassed by the foregoing definition it will be found that the photosensitivity characterizing a given species may vary, with the complex ferric salt-diazonium systems, as a rule, being found to display exceptionally high actinic response. It will also be understood that the present invention contemplates the usage of such ferric salts alone or in admixtures comprising two or more. The propriety for proceeding in a particular manner will depend primarily upon the speed requirements of the processor.

The electron-accepting diazonium compounds suitable for use in the catalyst systems described herein are conventional in the art and thus may be selected from the relatively wide range of materials. The salient and critical requirement with respect to such compounds of course is that they be capable of accepting an electron from the photo-reduced ferrous whereby to provide species, e.g., free radicals, capable of initiating vinyl monomer polymerization. Particularly beneficial results are noted to obtain with the use of diazonium compounds having peak absorption spectra in the 260 to 325 millimicrons region of the spectrum. Preferred compounds within this category include the stabilized diazonium salts. As examples of diazonium compounds found to function to exceptional advantages in the compositions and processing described herein there may be mentioned in particular, the following stabilized diazonium salts: p-toluene diazonium fluoborate, p-toluene diazonium fluosilicate, p-toluene diazonium chlorozincate, o-chlorobenzene diazonium chlorozincate, 4,4'-biphenylbis(diazonium fluoborate), benzene diazonium fluoborate, 2,5-dichlorobenzene diazonium fluoborate, 3,5-bis(trifluoromethyl) benzene diazonium chlorozincate, 2,4,6-trimethyl benzene diazonium hydrogen sulfate and p-ethoxycarbonyl benzene diazonium chlorozincate, etc.

The concentration of diazonium compound employed, as is the case with its ferric salt counterpart may vary, within limits, depending upon requirements. In any event, the vast majority of commercial requirements can be negotiated by the employment of such compound in concentrations ranging from about 0.5% to about 2.0% by weight of the total weight of coating composition. It will further be understood that the diazonium compound may also be efficaciously employed in admixture comprising two or more. Determination of optimum combinations can be readily determined in a particular instance by routine laboratory investigation.

The radiation-induced polymerization reaction characterizing the photosensitized compositions described herein can be further augmented by the incorporation therein of one or more compounds promotive of increased actinic response. One such compound found to be particularly valuable for such use comprises zinc chloride. In any event, it will be understood that ingredients of this nature are strictly of an optional nature and are in no way essential to the realization of the improvements described herein. Auxiliary accelerating compounds offer the singular advantage that a net increase in spectral response may be effected without correspondingly increasing the quantity of catalyst material employed.

As mentioned hereinbefore, the monomer materials applicable in the practice of the present invention include the liquid to solid photopolymerizable ethylenically unsaturated organic compounds containing at least one non-aromatic double bond between adjacent carbon atoms. Compounds found to be particularly advantageous in this regard include the photopolymerizable vinyl or vinylidene compounds containing a $CH_2{=}C{<}$ group activated by direct attachment to a negative group such as halogen, $>C{=}O$, $—C{\equiv}N$, $—C{\equiv}C—$, —O—, or aryl. Examples of such photopolymerizable unsaturated organic compounds include acrylamide, N-ethanol acrylamide, diacetone, acrylamide, acrylic acid, methacrylic acid, methylolacrylamide, methacrylamide, vinyl acetate, vinyl pyrrolidone, methyl acrylate, ethyl acrylate, vinyl benzoate, methyl methacrylate, vinylmethyl ether, vinylbutyl ether, vinylisopropyl ether, vinylisobutyl ether and the like. These ethylenically unsaturated organic compounds, or monomers as they are often called, may be used alone or in admixture in order to vary the physical properties such as molecular weight, hardness, water insolubility, etc. of the final polymer.

In order to produce a vinyl polymer of the desired physical properties, it is also a recognized practice to polymerize the monomer(s) in the presence of a small amount of an unsaturated compound containing at least two terminal vinyl groups each linked to a carbon atom in a straight chain or in a ring, the function of such compounds being to cross-link the polyvinyl chain. Among such cross-linking agents for the purposes described herein may be mentioned N',N'-methylenebisacrylamide, calcium acrylate, triallyl cyanurate, divinyl benzene, divinyl ketones and diglycol diacrylate. Generally speaking, increasing the quantity of cross-linking agent increases the hardness of the polymer obtained.

The aforedescribed monomer-catalyst system may be preliminarily provided in the form of a suitable solution the nature of the solvent employed depending essentially upon the solubility characteristics of the monomer material. Thus for example in the case of water-soluble monomers, the solvent employed may be water alone or in admixture with ethyl alcohol or other water miscible organic solvents. Should one or more of the monomer materials employed be substantially water insoluble, the requisite dispersion may be provided by the use of one or more dispersing, wetting agents, etc. in order to facilitate dispersion or suspension of the involved ingredients. Conventional dispersing agents can be employed in this connection such as for example long chain fatty acid sarcosides or taurides, fatty acid sulfonates, sodium lauryl sulfate and the like.

In some instances, it may be desirable to employ water or alcohol soluble, dispersible or emulsifiable polymers or copolymers as carrier substances for the monomer(s), catalyst, etc. components. Examples of suitable materials for such purposes include polyvinyl alcohol; polyvinyl pyrrolidone; a copolymer consisting of 90 percent vinyl pyrrolidone with 10 percent 1-butene commercially available from the General Aniline & Film Corporation under the trade name Ganex V–904; a copolymer consisting of 80 percent vinyl pyrrolidone and 20 percent 1-butene and commercially available under the trade name Ganex V–804; a copolymer of 50 percent vinyl pyrrolidone and 50 percent alpha olefins of 16 carbon atoms chain length commercially available under the trade name Ganex V–516; a copolymer of 80 percent vinyl pyrrolidone and 20 percent alpha olefins of 16 carbon atoms chain length and commercially available under the trade name Ganex V–816; a copolymer of vinyl methyl ether and maleic anhydride manufactured and sold by the General Aniline & Film Corporation under the trade name Gantrez.

For purposes of insuring the obtention of photopolymerizable layers of suitable thickness it may be desirable to effect appropriate viscosity adjustments in the coating composition. Compounds for such purposes are well known in the art; in certain instances, the carrier substance itself, e.g., polyvinyl pyrrolidone or alternatively copolymers of vinyl methyl ether and maleic anhydride will suffice adequately for such purposes. For example, polyvinyl pyrrolidone is available from the General Aniline & Film Corporation in 3 grades as follows: K–30, average molecular weight 40,000; K–60, average molecular weight 160,000; K–90, average molecular weight 360,000. Since the intrinsic viscosity is related to molecular weight, it is manifest that any desired viscosity value at a fixed solids content can be obtained by resorting to blending of these polymers. Polyvinyl pyrrolidone K–60 is commercially available as a 45 percent aqueous solution; the K–90 grade is available as a 20 percent solution. Similarly, poly(methyl vinyl ether/maleic anhydride) copolymer is available from the General Aniline & Film Corporation in 3 grades as follows: Gantrez AN–119, Gantrez AN–139 and Gantrez AN–169; at any given concentration, the viscosity of aqueous solutions of Gantrez AN is a log function of the molecular weight of the copolymer. Blending at a fixed solids content to any desired viscosity value is thus possible.

Aqueous slurries of luminescent materials, such as those used in the manufacture of color television tube screens, have been shown to be alkaline in nature, i.e., exhibiting a pH in the range of approximately 9.0 to 10.0. Since ferric compounds are known to be precipitated in alkaline solution, it is desirable to formulate a carrier composition such that the pH after addition thereto of the phosphor, either by the dusting or slurry techniques previously described, be on the acid side, approximately 4.0, to prevent precipitation of the ferric salt component of the catalyst system. Suitable additives for pH control include acetic acid, formic acid, citric acid, tartaric acid, oxalic acid, succinic acid, acrylic acid, methacrylic acid, dilute mineral acid such as hydrochloric acid, itaconic or citraconic acids. These acids may be used alone or in combination to effect the desired pH adjustment. Adjustment of the hydrogen ion concentration as indicated serves a secondary purpose in that it increases the stability of the diazonium component of the catalyst system.

Prior to applying the radiant energy-sensitive coating to the glass substrate it may be advisable to precoat the latter to promote adhesion of the light-sensitive layer. This can be accomplished by the application of the dilute solution of polyvinyl alcohol, followed by a brief heat cure at a moderately elevated temperature, within the range, for example, of from 75 to 100° C. The addition of phosphoric acid is found to promote adhesion of the polymer layer to non-porous surfaces such as glass. Particularly beneficial results are obtained by the employment of phosphoric acid in amounts approximately 15% by weight of the polymer. Another alternative involves the use of alkacrylato chromic halides. These materials are Werner-type compounds in which methacrylic or ethacrylic acid is coordinated with chromium to form a highly reactive complex. When applied to a surface, especially a negatively charged one such as glass, the chromium complex is strongly held. With effective removal of the halogen atoms, as for example by ionization, the addition of dilute ammonium hydroxide to the Werner complex to a pH value in the range of 5.0 to 6.0 forms a polymer by interaction between a chromium atom and a hydroxyl group. This forms an oxygen bridge connecting two or more of the complexes. The chromium atoms of the complex then react with active atoms, such as oxygen, on the surface to which the complex is applied. When properly applied, it is theoretically possible to have all of the unsaturated groups oriented outward in a position readily available for further reaction with other unsaturated groups in the light-sensitive layer as hereinbefore described. Bonding of the radiant energy-sensitive layer therefore occurs via a cross-linking reaction of its unsaturated groups with those resident on the surface of the glass after treatment with the Werner complex.

As previously indicated, the photosensitive compositions of the present invention are uniquely and beneficially adapted to color television picture tube manfacturing operations based upon photographic reproduction methods. The several steps essential to the practice of such methods have been summarized in some detail hereinbefore; basically, the steps involved comprise first coating the inside surface of the television picture tube viewing panel by flowing, spraying or whirling with the photo-sensitive composition containing the polymerizable monomer, catalyst components and one or more optional ingredients; as will be understood, the monomer-catalyst coating composition may be initially provided with the phosphor material or alternatively, the phosphor may be applied by dusting or other suitable method to the monomer-catalyst coated layer while the latter remains in a tacky condition. The coating is thereafter exposed through a shadow mask whereby to form a latent image of the dark pattern, i.e., in the form of hardened, polymerized areas in the monomer-catalyst layer. Alternatively, the phosphor material may be applied subsequent to the exposure operation, this procedure obviating any requirement for drying the photosensitive layer prior to exposure. The tacky condition of the photosensitive coating, of course, facilitates adhesion of the phosphor particles. Unexposed areas are thereafter removed by washing with deionized water. This sequence of steps is thereafter repeated for each of the remaining color aspects.

A typical composition found to be eminently suitable for use herein comprises the following:

FORMULATION I

Polyvinyl pyrrolidone K–30—2.5 g.
Polyvinyl pyrrolidone K–60 (45% sol.)—16.67 g.
Ferric ammonium oxalate (36% aq. sol.)—2 ml.
N,N′-methylenebisacrylamide—5.0 g.
Ethyl alcohol (95%)—140 ml.
Hydrochloric acid 1:1—2.0 g.
Citric acid—3.0 g.
p-Toluenediazonium chlorozincate—5.0 g.
Water—185 ml.

Processing of the above composition in the manner described hereinbefore provides a tricolor phosphor pattern, such procedure being implemented for each of the red, blue and green phosphor patterns, having exceptional luminosity and brilliance. Moreover, none of the objectionable features characterizing the use of dichromate-polyvinyl alcohol systems is in any way evident. The addition of zinc chloride to the above composition serves to significantly enhance the polymerization reaction rate. In order to capitalize upon the accelerating effects of the zinc chloride, a holding period of approximately 10 minutes is advisable prior to the wash-out step. This allows sufficient time for the zinc chloride to exert its full catalytic effect. Similar improvement in phosphor luminosity is obtained when the ferric ammonium oxalate in the above-delineated formulation is substituted in equivalent amounts by ferric ammonium citrate; similar improvement likewise attends the replacement of p-toluenediazonium chlorozincate with p-toluenediazonium fluosilicate, benzene diazonium fluoborate and 2,4,6 - trimethyl-benzenediazonium hydrogen sulfate respectively.

Other formulations found to be particularly effective comprise the following:

FORMULATION II

Polyvinyl pyrrolidone K–60 (45% sol.)—14.25 g.
Polyvinyl pyrrolidone K–90 (20% sol.)—39.0 g.
Ferric ammonium oxalate (36% sol.)—2 ml.
N,N′-methylenebisacrylamide—1.0 g.
Acrylic acid (glacial)—4.5 g.
Zinch chloride—2.0 g.
p-Toluene diazonium chlorozincate—2.5 g.
Water to make total volume to 340 ml.

FORMULATION III

Polyvinyl pyrrolidone K–60 (45% sol.)—14.25 g.
Polyvinyl pyrrolidone K–90 (20% sol.)—3.0 g.
Ferric ammonium oxalate (36% sol.)—2 ml.
N,N′-methylenebisacrylamide—4.0 g.
Acrylic acid (glacial)—4.0 g.
Ganex V–904—3.0 g.
Zinc chloride—2.0 g.
p-Toluene diazonium chlorozincate—2.5 g.
Ethyl alcohol (95%)—140 ml.
Water—185 ml.

FORMULATION IV

Gantrez AN/119 (10% sol.)—250 ml.
N,N′-methylenebisacrylamide—15.0 g.
Ferric ammonium citrate (20% sol.)—10 ml.
Zinc chloride—6.0 g.
p-Tolune diazonium chlorozincate—7.5 g.
Ethyl alcohol (95%)—375 ml.
Water to make 1000 ml.

A further significant advantage of the compositions provided by the present invention relates to the fact that they may be used to advantage in the preparation of color television tube screens regardless of the technique employed, e.g., whether the phosphor material be included as an integral compound of the photosensitive layer compositions or alternatively, whether such phosphor material be applied subsequent to coating but prior to exposure, or alternatively, subsequent to exposure.

This invention has been described with respect to certain preferred embodiments and there will become obvious to persons skilled in the art other variations, modifications and equivalents which are to be understood as coming within the scope of the present invention.

What is claimed is:

1. A radiation sensitive photopolymerizable composition comprising a normally liquid to normally solid ethylenically unsaturated monomer containing the grouping $CH_2{=}C<$ attached directly to an electronegative group and a radiation sensitive catalyst system which when subjected to radiant energy forms species capable of initiating the polymerization of said monomer, said catalyst system comprising (a) a stabilized diazonium salt which functions as an electron-acceptor and (b) a photosensitive co-catalyst selected from the group consisting of (1) a ferric double salt containing an electron-donating group wherein the cation component of the double salt is a member selected from the group consisting of ferric ammonium-cation and ferric alkali metal cation and (2) a mixture comprising a simple ferric salt in which the anion group is not electron-donating and an organic polycarboxylic acid capable of reducing said simple ferric salt to ferrous when subjected to actinic radiation.

2. A composition according to claim 1, wherein said catalyst system comprises (a) a stabilized diazonium salt which functions as an electron-acceptor and (b) a ferric double salt containing an electron-donating group wherein the cation component of the double salt is a member selected from the group consisting of ferric ammonium cation and ferric alkali metal cation.

3. A composition according to claim 2, wherein said complex ferric salt comprises ferric double ammonium oxalate.

4. A composition according to claim 2, wherein said complex ferric salt comprises ferric double ammonium citrate.

5. A composition according to claim 1, wherein said stabilized diazonium salt comprises p-toluenediazonium chlorozincate.

6. A composition according to claim 1, wherein said stabilized diazonium salt comprises p-toluenediazonium fluosilicate.

7. A composition according to claim 1, wherein said stabilized diazonium salt comprises benzenediazonium fluoborate.

8. A composition according to claim 1, wherein said stabilized diazonium salt comprises 2,4,6-trimethylbenzene diazonium hydrogen sulfate.

9. A composition according to claim 1 further containing phosphor particles.

10. A composition according to claim 1 further containing zinc chloride.

11. In a process for providing the surface of a cathode ray tube viewing panel with a phosphor pattern thereon comprising the steps of coating said surface with a layer of a photosensitive composition, exposing to light rays predetermined portions of said layer in conformity with said pattern, and developing the exposed layer by a washing out operation to remove unexposed portions of said layer, phosphor material being applied in admixture with said photosensitive composition or subsequent to said coating step but prior to development of the exposed layer, the improvement comprising employing as the photosensitive composition a radiation sensitive photopolymerizable composition comprising a normally liquid to normally solid ethylenically unsaturated monomer containing the grouping $CH_2{=}C<$ attached directly to an electronegative group and a radiation sensitive catalyst system which when subjected to radiant energy forms species capable of initiating the polymerization of said monomer, said catalyst system comprising (a) a stabilized diazonium salt which functions as an electron-acceptor and (b) a photosensitive co-catalyst selected from the group consisting of (1) a ferric double salt containing an electron-donating group wherein the cation component of the double salt is a member selected from the group consisting of ferric ammonium-cation and ferric alkali metal cation and (2) a mixture comprising a simple ferric salt in which the anion group is not electron-donating and an organic polycarboxylic acid capable of reducing said simple ferric salt to ferrous when subjected to actinic radiation.

12. A process as defined in claim 11 wherein said composition further contains zinc chloride.

13. A process as defined in claim 11 wherein said phosphor material is applied in admixture with said composition.

References Cited

UNITED STATES PATENTS

| | | | |
|---|---|---|---|
| 2,661,331 | 12/1953 | Howard | 204—159.24 |
| 2,807,545 | 9/1957 | Frederick | 96—75 |
| 3,101,270 | 8/1963 | Evans et al. | 96—115 |
| 3,110,592 | 11/1963 | Schwein et al. | 96—35.1 |
| 3,164,539 | 1/1965 | Smith | 96—36.1UX |
| 3,201,237 | 8/1965 | Cerwonka | 96—35.1 |
| 3,406,068 | 10/1968 | Law | 96—45.1X |

DAVID KLEIN, Primary Examiner

U.S. Cl. X.R.

96—36.1, 115; 204—159.24

Disclaimer

3,585,034.—*Steven Levinos,* Vestal, N.Y. MANUFACTURE OF PHOSPHOR SCREENS. Patent dated June 15, 1971. Disclaimer filed Sept. 30, 1982, by the assignee, *Eastman Kodak Co.*

Hereby enters this disclaimer to all claims of said patent.

[*Official Gazette April 5, 1983.*]